US012061439B2

(12) United States Patent
Kubo

(10) Patent No.: US 12,061,439 B2
(45) Date of Patent: Aug. 13, 2024

(54) IMAGE FORMING DEVICE

(71) Applicant: SHARP KABUSHIKI KAISHA, Sakai (JP)

(72) Inventor: Takashi Kubo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/126,316

(22) Filed: Mar. 24, 2023

(65) Prior Publication Data

US 2023/0324847 A1 Oct. 12, 2023

(30) Foreign Application Priority Data

Apr. 11, 2022 (JP) ................................. 2022-065293

(51) Int. Cl.
*G03G 21/20* (2006.01)

(52) U.S. Cl.
CPC .................................. *G03G 21/206* (2013.01)

(58) Field of Classification Search
CPC ..... G03G 21/20; G03G 21/203; G03G 21/206
See application file for complete search history.

(56) References Cited

U.S. PATENT DOCUMENTS

2013/0272744 A1* 10/2013 Wakayama .......... G03G 21/203 399/97
2014/0233979 A1* 8/2014 Namba .............. G03G 21/1623 399/97
2015/0117893 A1* 4/2015 Makino .............. G03G 21/1619 399/92
2018/0088499 A1* 3/2018 Inada ................. G03G 15/2017
2020/0041956 A1* 2/2020 Shiratori .............. G03G 21/203
2023/0185228 A1* 6/2023 Kubo ..................... G03G 15/80 399/88

FOREIGN PATENT DOCUMENTS

JP 2013195731 A * 9/2013
JP 2015-030097 A 2/2015

OTHER PUBLICATIONS

Machine Translation of JP-2013195731-A. (Year: 2013).*

* cited by examiner

*Primary Examiner* — Carla J Therrien
(74) *Attorney, Agent, or Firm* — ScienBiziP, P.C.

(57) ABSTRACT

The image forming device includes a housing covering a device main body, a ventilation portion through which air is supplied and discharged, the ventilation portion being provided on a side face of the housing, and a leaked water catcher provided below the ventilation portion and protruding toward an interior of the device main body.

6 Claims, 8 Drawing Sheets

IMAGE FORMING DEVICE

TECHNICAL FIELD

The disclosure relates to an image forming device including a housing that covers a device main body.

BACKGROUND ART

In recent years, image forming devices that form images on sheets are installed in various environments, such as offices, stores, and homes. Depending on the installation environment of the image forming device, various situations are assumed. For example, water may be poured onto the image forming device due to a sudden accident. When a liquid such as water reaches the interior of the image forming device, the liquid may spill onto a major part of the image forming device, such as a substrate, which may hinder normal operation and cause damage. For this reason, there is known a printing device (image forming device) provided with a liquid discharge port for guiding liquid to the outside of a housing to reduce the amount of liquid reaching the interior of the printing device.

SUMMARY

Technical Problem

This known printing device includes a main body portion that performs printing on a sheet and a housing that covers the main body portion, and is configured to discharge the sheet from a sheet output port provided on a top face of the housing. Furthermore, it is known that such a printing device includes a liquid catcher that receives liquid entering from the top face, a first flow path that guides the liquid received at the liquid catcher toward an outer edge of the main body portion, a second flow path that guides the liquid guided by the first flow path to a bottom face of the housing, and a liquid discharge port that discharges the liquid guided by the second flow path to the outside of the housing.

In such an image forming device, a ventilation hole (louver) for cooling the interior of the image forming device may be provided in a side face of the housing. With this configuration, the entry path of the liquid is not limited to the sheet output port provided on the top face of the housing. Therefore, with the printing device described above, there is a concern that liquid may enter from the side face of the housing and the printing device is unable to deal with this situation.

The disclosure has been made to solve the problem described above, and an object thereof is to provide an image forming device that can receive water that has reached an interior of the image forming device and dripped down along a side face.

Solution to Problem

An image forming device according to the disclosure includes a housing covering a device main body, a ventilation portion through which air is supplied and discharged, the ventilation portion being provided on a side face of the housing, and a leaked water catcher provided below the ventilation portion and protruding toward an interior of the device main body.

In the image forming device according to the disclosure, the leaked water catcher may include a catcher bottom face located below the ventilation portion and extending toward the interior of the device main body and a catcher erected face erected on a peripheral edge of the catcher bottom face.

In the image forming device according to the disclosure, the catcher bottom face may be inclined, increasing in height as a distance from the side face of the housing increases.

In the image forming device according to the disclosure, the catcher bottom face may be inclined with respect to a width direction along the side face of the housing.

In the image forming device according to the disclosure, the catcher erected face may be inclined, extending upwardly outward from the peripheral edge of the catcher bottom face.

In the image forming device according to the disclosure, the leaked water catcher may face a lowermost portion of the ventilation portion.

In the image forming device according to the disclosure, the leaked water catcher may have a lateral width in a width direction along the side face of the housing being greater than a width of the ventilation portion in the width direction.

In the image forming device according to the disclosure, a plurality of the leaked water catchers may be disposed in the housing, and the plurality of leaked water catchers may be connected to each other.

Advantage Effects of Disclosure

According to the disclosure, water that has reached an interior of a device main body through a ventilation portion and dripped down along a side face can be received by a leaked water catcher, making it possible to prevent other components accommodated in the interior from getting wet and avoid a fire or failure of the image forming device.

DESCRIPTION OF EMBODIMENTS

First Embodiment

An image forming device according to a first embodiment of the disclosure will be described below with reference to the accompanying drawings.

Figure 1:
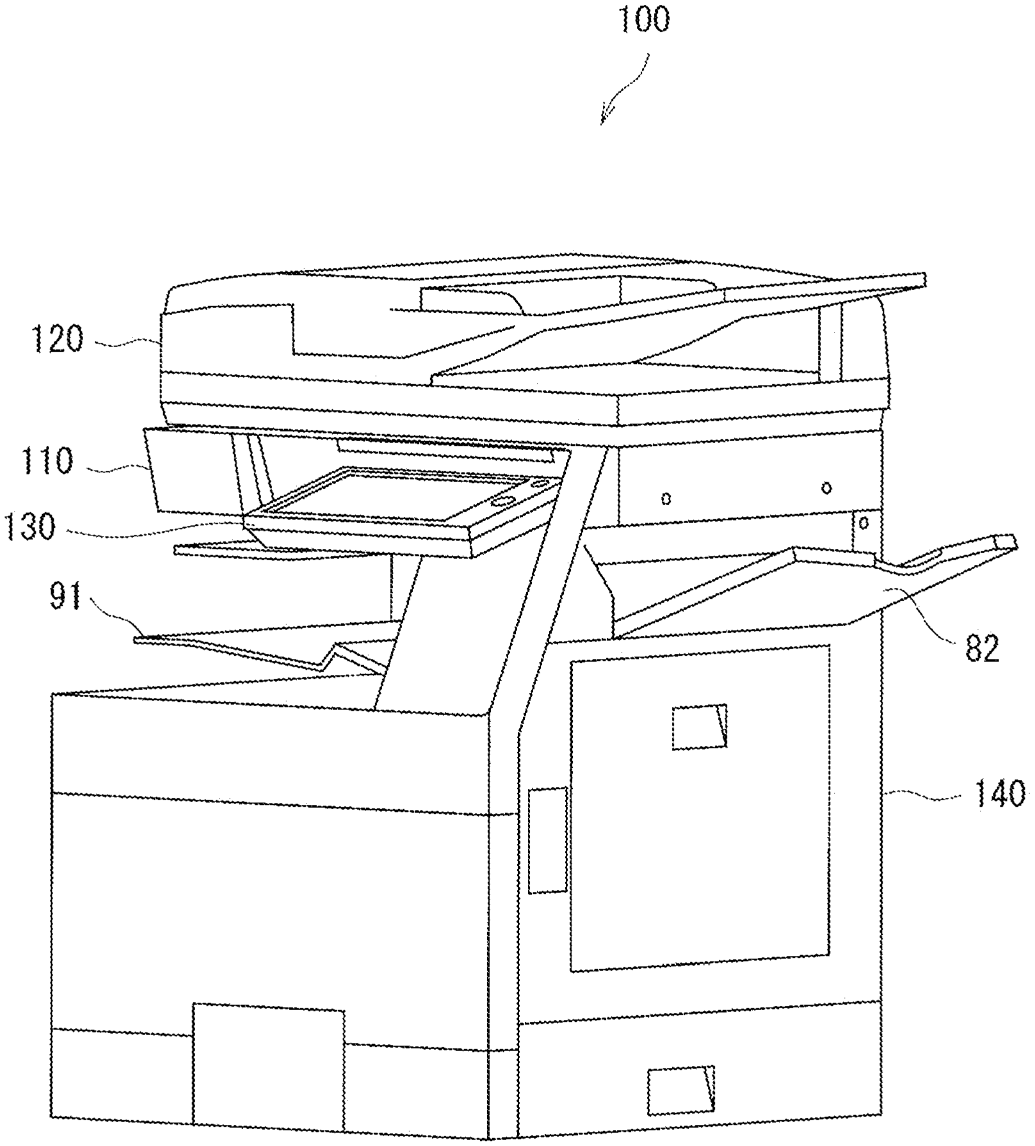
FIG. 1 is an external perspective view illustrating an image forming device according to a first embodiment of the disclosure.
Figure 2:
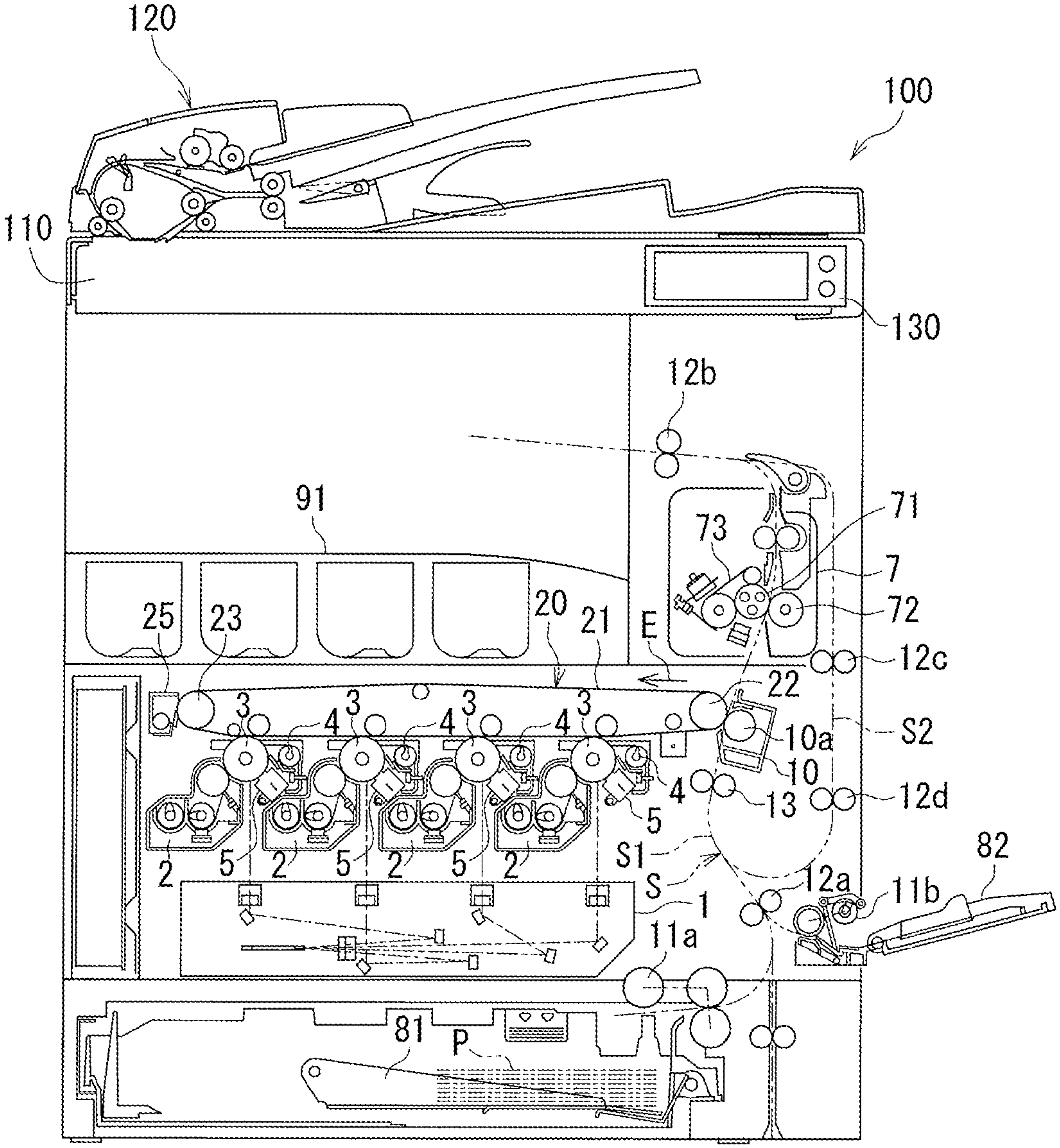
FIG. 2 is a schematic configuration diagram of the image forming device illustrated in FIG. 1.

FIG. 1 is an external perspective view illustrating the image forming device according to the first embodiment of the disclosure, and FIG. 2 is a schematic configuration diagram of the image forming device illustrated in FIG. 1.

An image forming device 100 is a multifunction printer having functions such as a scanner function, a copy function, a printer function, and a facsimile function, and is configured to transmit an image of a document scanned by an image scanning device 110 to an external device (corresponding to the scanner function), or form an image of a scanned document or an image received from an external device on a sheet in color or black and white (corresponding to the copy function, the printer function, and the facsimile function).

A document feeding device 120 (automatic document feeder (ADF)) supported in an openable/closable manner by the image scanning device 110 is provided on an upper side of the image scanning device 110. When the document feeding device 120 is opened, the image scanning device 110 is upwardly opened, and a document (sheet) can be manually placed on the image scanning device 110. Alternatively, the document feeding device 120 automatically feeds a placed document onto the image scanning device 110. The image scanning device 110 scans the placed document or a document fed from the document feeding device 120 to generate image data.

The image forming device 100 includes an exposure device 1, a development device 2, a photoreceptor drum 3, a cleaner device 4, a charger 5, an intermediate transfer belt device 6, a fixing device 7, a feed tray 81, a bypass tray 82, an output tray 91, and a sheet feeding path S, and forms a color image or a black and white image on a predetermined sheet in accordance with image data transmitted from an external device.

The image data used in the image forming device 100 corresponds to a color image made up of the colors of black (K), cyan (C), magenta (M), and yellow (Y). Accordingly, four development devices 2, four photoreceptor drums 3, four chargers 5, and four cleaner devices 4 are provided and set to black, cyan, magenta, and yellow, respectively, to form four types of latent images corresponding to each color. Thus, four image stations are configured.

The photoreceptor drums 3 are each disposed substantially at the center of the image forming device 100. The chargers 5 each uniformly charge the surface of each photoreceptor drum 3 such that the surface of each photoreceptor drum 3 has a predetermined potential. The exposure device 1 exposes the surface of each photoreceptor drum 3 to form an electrostatic latent image. The development devices 2 each develop the surface of each photoreceptor drum 3 where the electrostatic latent image is formed to form a toner image on the surface of each photoreceptor drum 3. With this series of operations, a toner image of each color is formed on the surface of each photoreceptor drum 3. The cleaner devices 4 each remove and collect residual toner on the surfaces of the photoreceptor drums 3 after development and image transfer.

An intermediate transfer belt device 20 is disposed above the photoreceptor drums 3 and includes an intermediate transfer belt 21, an intermediate transfer belt driving roller 22, an intermediate transfer belt driven roller 23, and an intermediate transfer belt cleaning device 25.

The intermediate transfer belt 21 is disposed in a tensioned state across the intermediate transfer belt driving roller 22 and the intermediate transfer belt driven roller 23, which are configured to move the surface of the intermediate transfer belt 21 in a predetermined direction (direction of the arrow E in FIG. 2).

The intermediate transfer belt 21 moves around the intermediate transfer belt driving roller 22 and the intermediate transfer belt driven roller 23 in the direction of the arrow E, the residual toner is removed and collected by the intermediate transfer belt cleaning device 25, and the toner images of each color formed on the respective surfaces of the photoreceptor drums 3 are sequentially transferred and superimposed to form a color toner image on the surface of the intermediate transfer belt 21.

The image forming device 100 further includes a secondary transfer device 10 including a transfer roller 10*a*. The transfer roller 10*a* forms a nip region with the intermediate transfer belt 21, and a sheet fed through the sheet feeding path S is fed while being nipped in the nip region. When the sheet passes through the nip region, the toner image on the surface of the intermediate transfer belt 21 is transferred to the sheet.

The feed tray 81 is a tray for storing sheets to be used for image formation, and is provided below the exposure device 1. The bypass tray 82 is provided on a side face of the image forming device 100, and is a tray on which a sheet used for image formation can be placed. The output tray 91 is provided on an upper side of the image forming device 100, and is a tray for placing sheets on which images have been formed.

The sheet feeding path S includes a main path S1 having an S-shape, and a reverse path S2 that branches off from and joins the main path S1 again. A pickup roller 11*a*, a bypass pickup roller 11*b*, a pre-registration roller 12*a*, a registration roller 13, the secondary transfer device 10, the fixing device 7, and an output roller 12*b* are disposed along the main path S1. The reverse path S2 branches from between the fixing device 7 and the output roller 12*b*, passes through a reverse feeding roller 12*c* and a reverse feeding roller 12*d*, and joins the main path S1 again between the pre-registration roller 12*a* and the registration roller 13.

The pickup roller 11*a* is provided in the vicinity of an end portion of the feed tray 81, and is a so-called pull-in roller that supplies sheets one by one from the feed tray 81 to the sheet feeding path S. The registration roller 13 temporarily holds the sheet fed from the feed tray 81, and feeds the sheet to the transfer roller 10*a* at a timing at which a leading end of the toner image on the photoreceptor drum 3 and a leading end of the sheet are aligned with each other. The pre-registration roller 12*a* is a small roller for promoting and assisting the feeding of the sheet.

The fixing device 7 includes a fixing roller 71, a pressure roller 72 pressed by the fixing roller 71, and a heating unit 73 that heats the fixing roller 71. The fixing device 7 receives a sheet on which an unfixed toner image is formed, and feeds the sheet while nipping the sheet between the fixing roller 71 and the pressure roller 72. The sheet with the image fixed is discharged onto the output tray 91 by the output roller 12*b*.

In a case in which an image is to be formed not only on the front side but also on the back side of the sheet, the sheet is fed in a reverse direction from the output roller 12*b* to the reverse path S2 to reverse the front and back of the sheet, the sheet is guided again to the registration roller 13, an image is formed on the back side in the same manner as on the front side, and the sheet is discharged to the output tray 91.

An operation panel 130 including an input unit and a display unit is provided on an upper portion of a side face of the image forming device 100, on a front face side. In the operation panel 130, buttons or the like may be provided outside a frame of the display unit, or the display unit may be a touch panel and also serve as an input unit.

As illustrated in FIG. 1, the document feeding device 120 is provided on the upper portion of the image forming device 100, and the image scanning device 110 is provided below the document feeding device 120. Further, the output tray 91 is provided below the image scanning device 110 and substantially at the center of the image forming device 100.

The image forming device 100 includes a housing 140 that covers a device main body. In the present embodiment, a ventilation portion 150 through which air is supplied and discharged is provided on a side face of the housing 140 corresponding to a rear face of the image forming device 100. Next, a portion of the housing 140 on the rear face side of the image forming device 100 will be described with reference to FIGS. 3 to 7.

Figure 3:
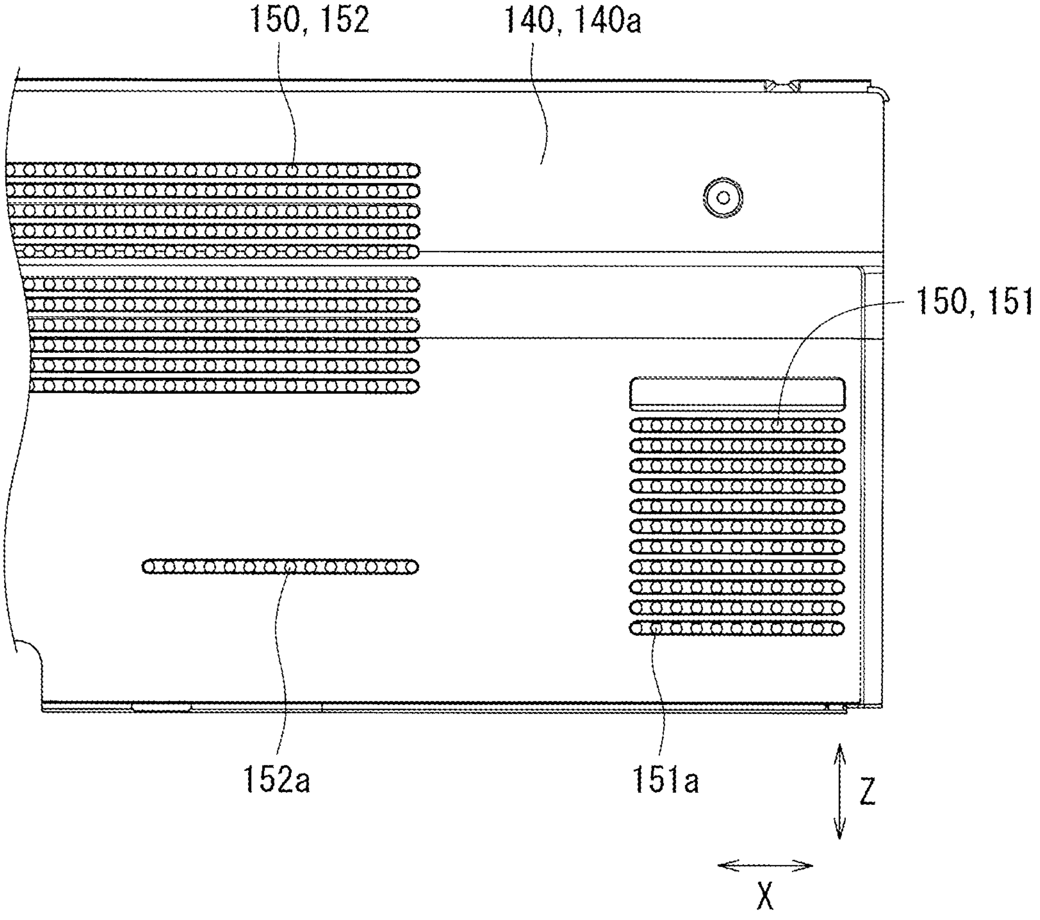
FIG. 3 is an enlarged front view illustrating a portion of a front face side of a housing.

FIG. 3 is an enlarged front view illustrating a portion of the front face side of the housing.

In FIG. 3, the area around the ventilation portion 150, which is a part of the housing 140, is illustrated in an enlarged manner. The front face of the housing 140 (housing front face 140*a*) faces the outside of the image forming device 100, and the rear face of the housing 140 (housing rear face 140*b* illustrated in FIG. 4) faces the inside of the image forming device 100. Hereinafter, for clarity of description, a lateral direction along a side face of the housing 140 may be referred to as a width direction X, a longitudinal direction along the side face of the housing 140 may be referred to as a height direction Z, and a direction extending through the housing 140 itself may be referred to as a thickness direction Y.

The ventilation portion 150 is constituted by a plurality of ventilation holes disposed side by side, and air is supplied and discharged between the outside and inside of the image forming device 100 through the ventilation holes. In the image forming device 100, an opening such as a duct may be disposed at a location facing the ventilation portion 150. Note that the ventilation portion 150 only needs to include holes that extend through the housing 140 itself, and may be constituted by holes elongated in one direction, such as louvers or slits. In the present embodiment, the ventilation portion 150 is provided at two locations of the housing 140 on the rear face side. Hereinafter, to distinguish the two, one ventilation portion 150 (on the right side in FIG. 3) may be referred to as a first ventilation group 151, and the other ventilation portion 150 (on the left side in FIG. 3) may be referred to as a second ventilation group 152. Further, in the first ventilation group 151, the ventilation hole provided at a lowest position (lowermost portion) in the height direction Z may be referred to as a first lowermost portion 151*a*, and in the second ventilation group 152, the ventilation hole provided at the lowermost portion may be referred to as a second lowermost portion 152*a*.

Figure 4:
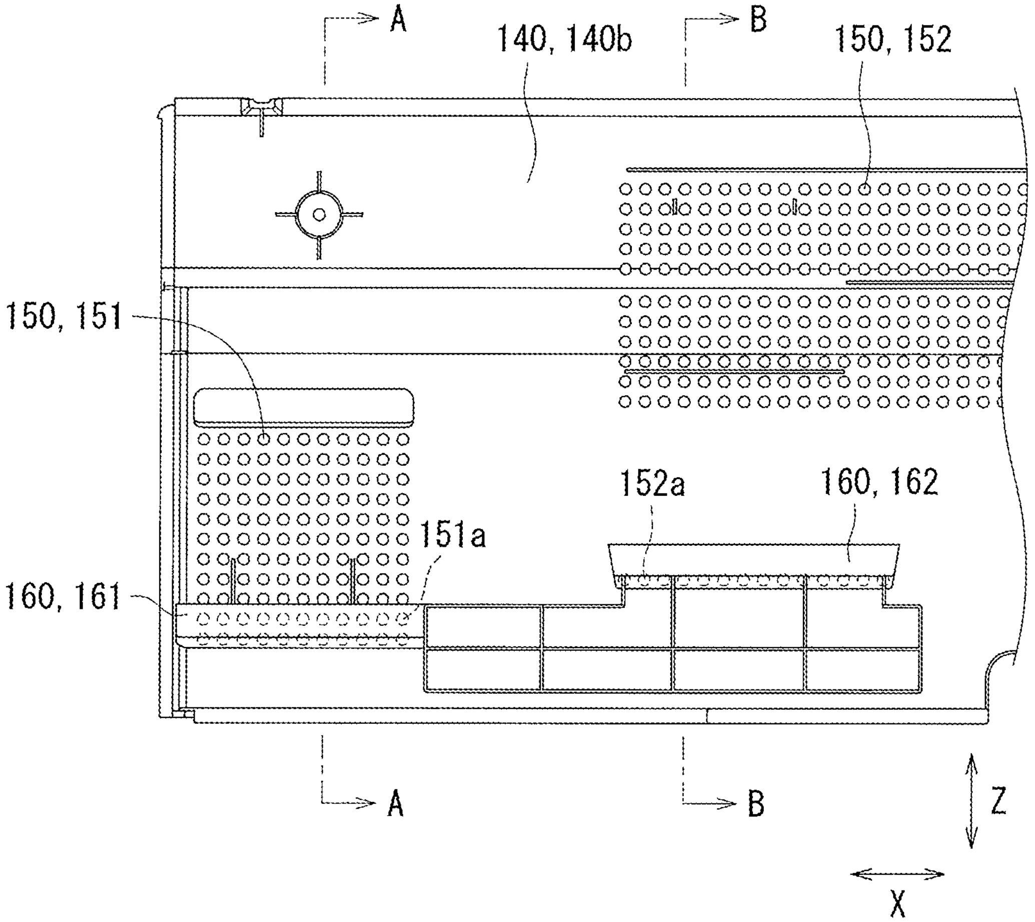
FIG. 4 is an enlarged front view illustrating a portion of a rear face side of the housing.
Figure 5:
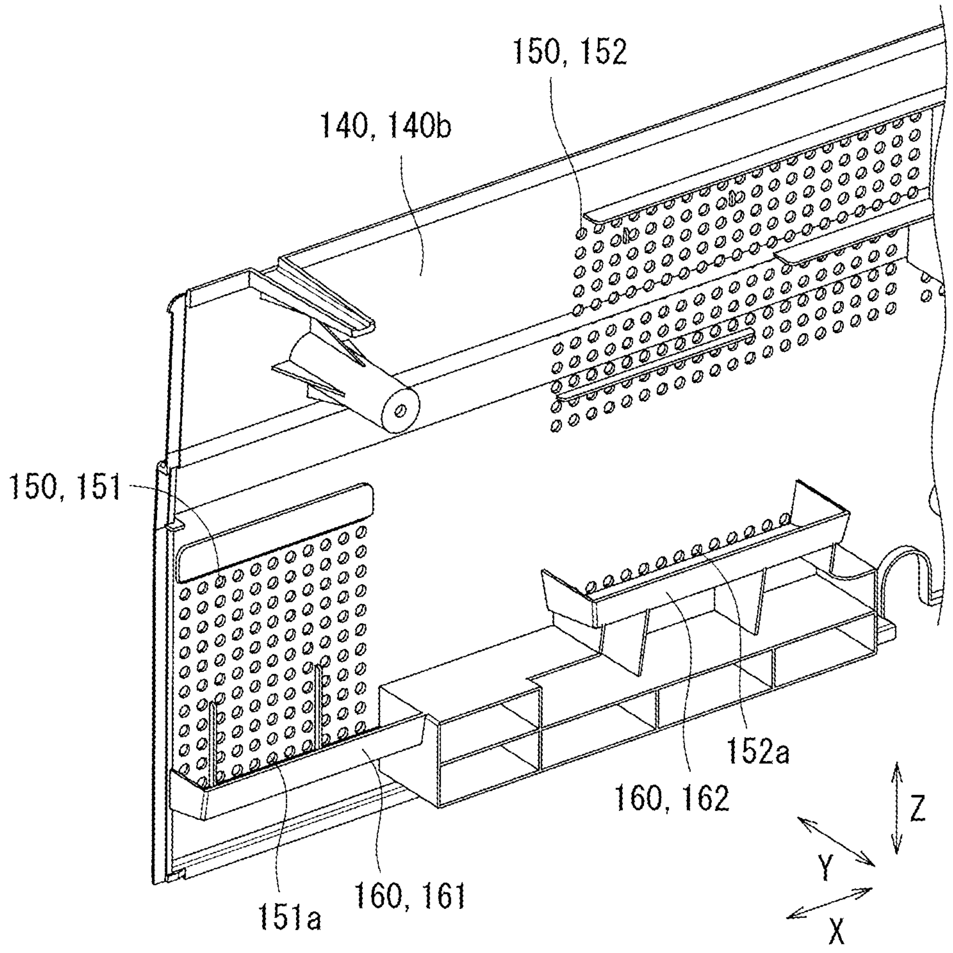
FIG. 5 is an enlarged perspective view illustrating a portion of the rear face side of the housing.

FIG. 4 is an enlarged front view illustrating a portion of the rear face side of the housing, and FIG. 5 is an enlarged perspective view illustrating a portion of the rear face side of the housing.

FIGS. 4 and 5 illustrate the portion of the housing 140 illustrated in FIG. 3 as viewed from the rear face side. On the rear face side of the housing 140, a leaked water catcher 160 is provided at a position corresponding to the ventilation portion 150. The leaked water catcher 160 is located below the ventilation portion 150 and protrudes toward the interior of the device main body. In the present embodiment, the leaked water catcher 160 is provided correspondingly to each of the two ventilation portions 150. Hereinafter, to distinguish between the two, the leaked water catcher 160 corresponding to the first ventilation group 151 may be referred to as a first catcher 161, and the leaked water catcher 160 corresponding to the second ventilation group 152 may be referred to as a second catcher 162.

In the present embodiment, since the leaked water catchers 160 are provided, water that has reached the interior of the device main body through the ventilation portions 150 and dripped down along the side face is received by the leaked water catchers 160. This configuration makes it possible to prevent other components accommodated in the interior from getting wet, and to avoid a fire and failure of the image forming device 100.

As illustrated in FIGS. 4 and 5, the leaked water catchers 160 face the lowermost portions of the ventilation portion 150. Specifically, the first catcher 161 faces the first lowermost portion 151*a*, and the second catcher 162 faces the second lowermost portion 152*a*. Since the leaked water catchers 160 communicate with the lowermost portions of the ventilation portion 150, the ventilation portion 150 itself can be made to function as a water discharge port, and water accumulated in the leaked water catcher 160 can be discharged to the outside from the lowermost portion of the ventilation portion 150 without separately providing a water discharge port or the like.

Figure 6:
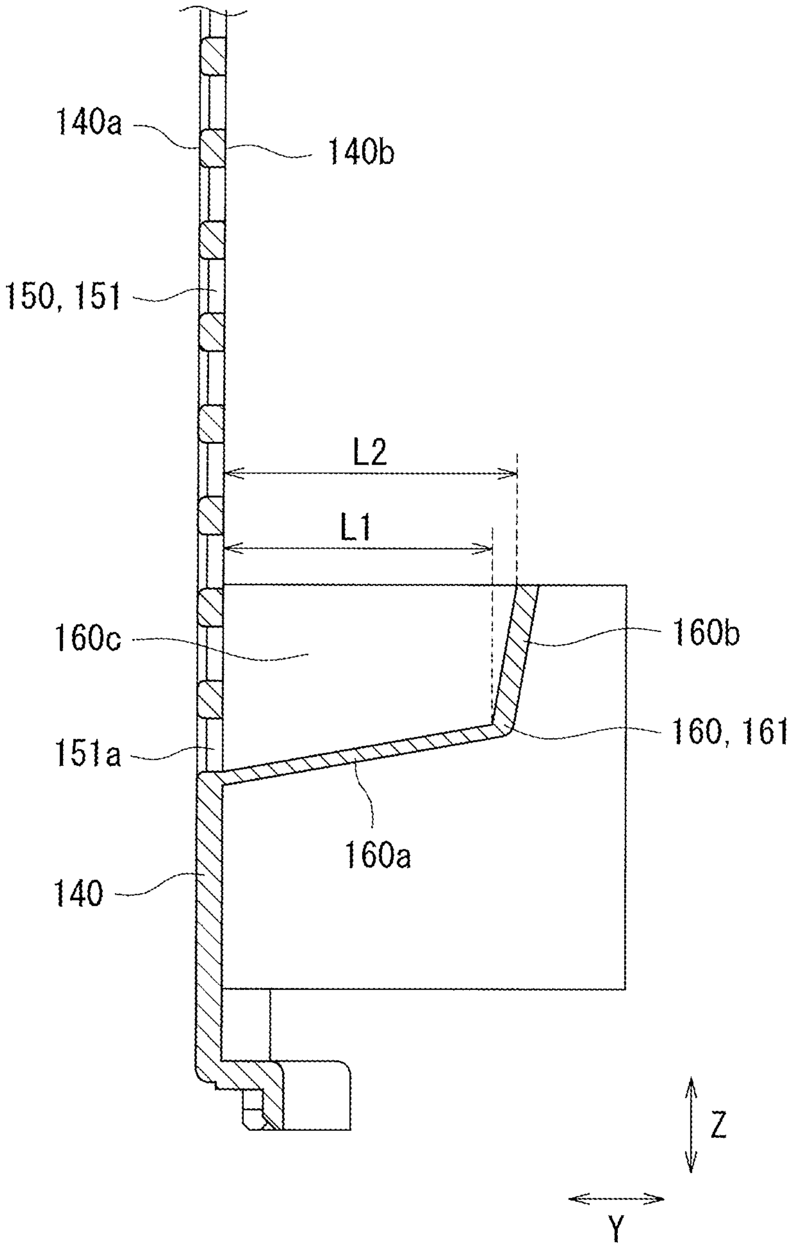
FIG. 6 is an enlarged cross-sectional view illustrating a cross section taken along arrow A-A in FIG. 4.
Figure 7:
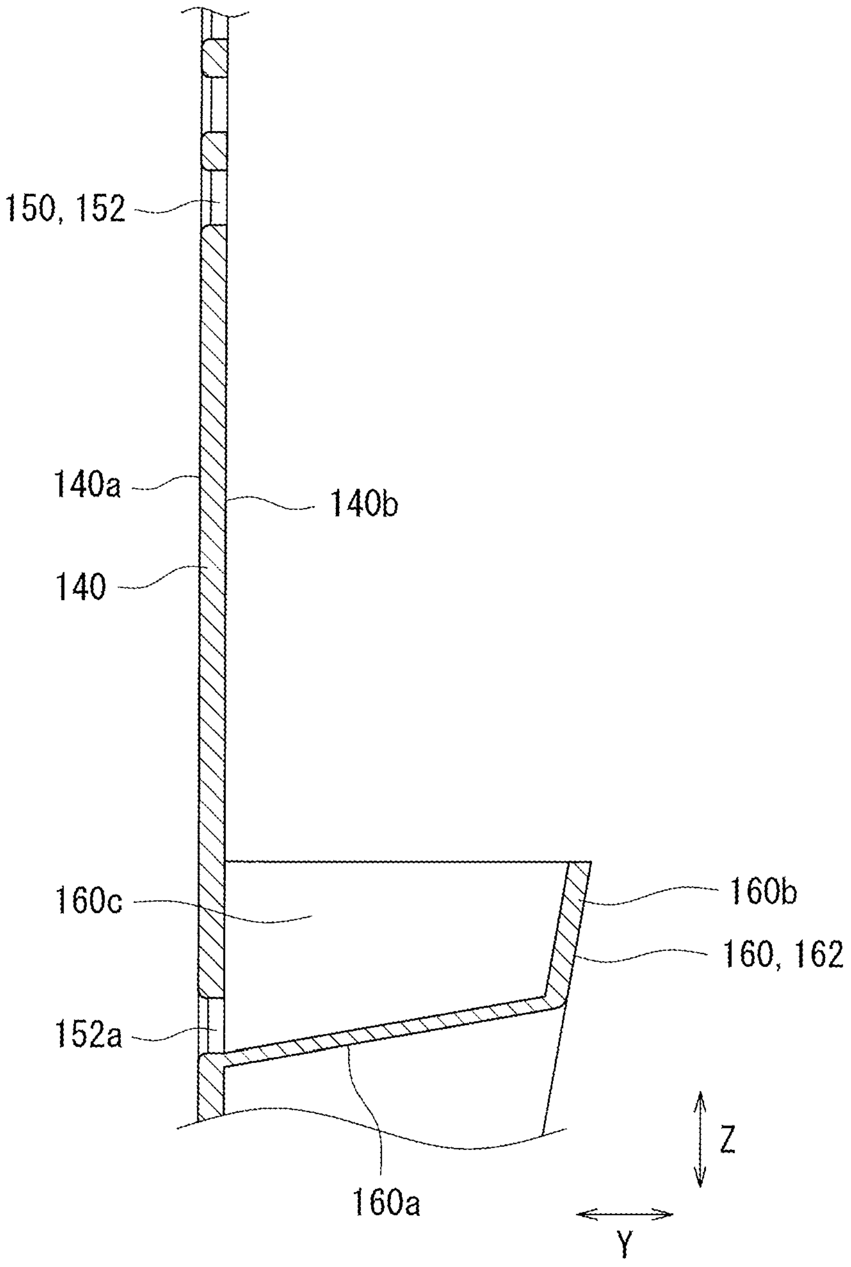
FIG. 7 is an enlarged cross-sectional view illustrating a cross section taken along arrow B-B in FIG. 4.

FIG. 6 is an enlarged cross-sectional view illustrating a cross section taken along arrow A-A in FIG. 4, and FIG. 7 is an enlarged cross-sectional view illustrating a cross section taken along arrow B-B in FIG. 4.

FIG. 6 illustrates a cross section of the housing 140 in the vicinity of the first ventilation group 151 and the first catcher 161. FIG. 7 illustrates a cross section of the housing 140 in the vicinity of the second ventilation group 152 and the second catcher 162. The leaked water catcher 160 includes a catcher bottom face 160*a* provided below the ventilation portion 150 and extending toward the interior of the device main body, and a catcher erected face erected on a peripheral edge of the catcher bottom face 160*a*. Specifically, the catcher bottom face 160*a* is located at a position slightly lower than the lowermost portion of the ventilation portion 150, and extends from the housing rear face 140*b* toward the interior of the device main body. At an end of the catcher bottom face 160*a*, a catcher counter face 160*b* (example of the catcher erected face) extending upwardly is erected. Further, catcher side faces 160*c* (examples of the catcher erected face) extending upwardly are erected on peripheral edges of the catcher bottom face 160*a*, facing each other in the width direction X. With the configuration described above, entering water is received by the catcher bottom face 160*a* and the received water is dammed by the catcher erected faces. Thus, the water received by the leaked water catcher 160 does not drip into the interior of the device main body.

The catcher bottom face 160*a* is inclined, increasing in height as a distance from the side face of the housing 140 increases. In other words, the side of the end protruding from the housing rear face 140*b* (right end in FIGS. 6 and 7) is higher than a portion connected to the housing rear face 140*b* (left end in FIGS. 6 and 7). With the inclination provided in the leaked water catcher 160, it is easier to discharge the water accumulated on the catcher bottom face 160*a* to the outside of the housing.

A catcher counter face 160*b* is inclined, extending upwardly outward from the peripheral edge of the catcher bottom face 160*a*. A first counter distance L1 illustrated in FIG. 6 is a distance from the housing rear face 140*b* to a lower end of the catcher counter face 160*b* in the thickness direction Y. Further, a second counter distance L2 is a distance from the housing rear face 140*b* to an upper end of the catcher counter face 160*b* in the thickness direction Y, and is longer than the first counter distance L1. Thus, since the catcher counter face 160*b* (catcher erected face) is inclined, the leaked water catcher 160 has a shape in which an upper end is opened wider, making it possible to take in leaked water from a wider range. Note that, as illustrated in FIG. 7 described below, the catcher side face 160*c* may also be inclined in the same manner as the catcher counter face 160*b*.

When a plurality of the leaked water catchers 160 are disposed in the housing 140 as in the present embodiment, a structure may be adopted in which the leaked water catchers 160 are connected to one another. In this case, a hole may be formed in a portion of each leaked water catcher 160 and a flow path connected to the holes may be provided, thereby connecting the leaked water catchers 160 to one another. The flow path need only be formed as appropriate by, for example walls or a pipe. In this way, by combining the locations where water is discharged into one, it is possible to reduce the locations of the housing 140 that get wet to a narrow range and to specify the locations to be treated with waterproofing or the like.

Second Embodiment

Next, an image forming device according to a second embodiment of the disclosure will be described with reference to the accompanying drawings. Note that the structure of the image forming device according to the second embodiment is substantially the same as that of the first embodiment illustrated in FIGS. 1 to 7, and thus the same reference signs will be used and descriptions and reference to drawings will be omitted.

Figure 8:
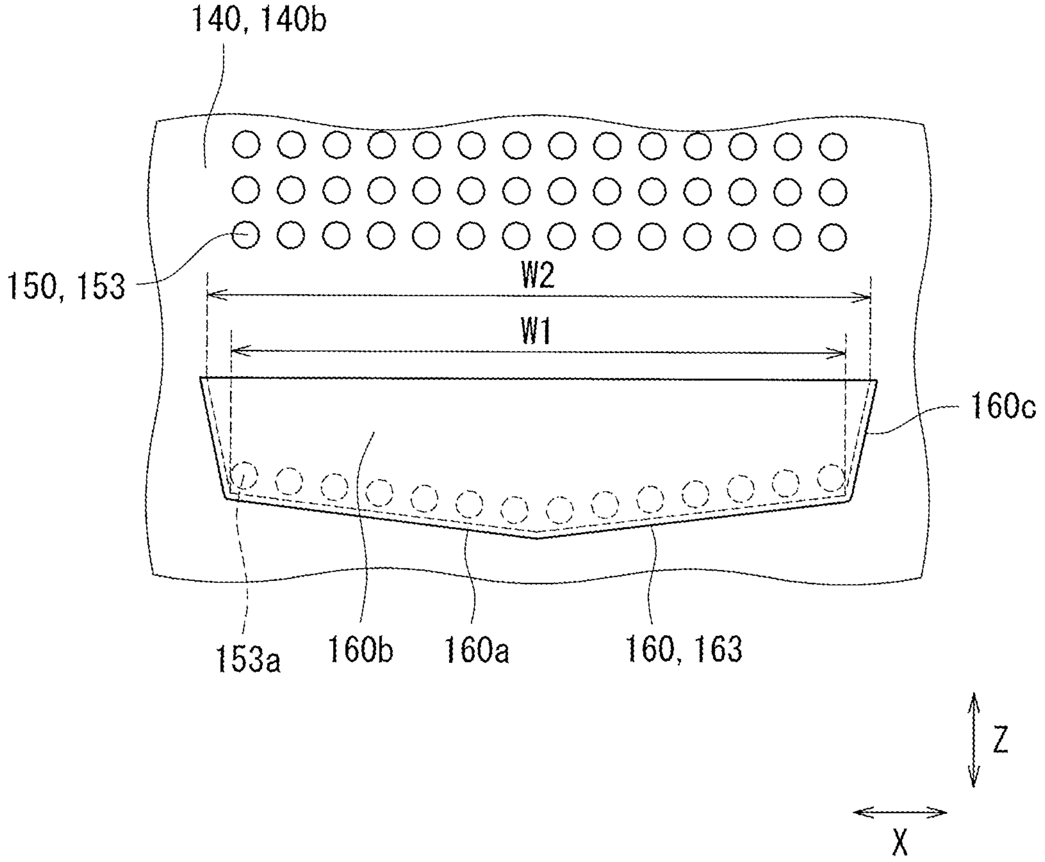
FIG. 8 is an enlarged schematic front view illustrating a portion of the rear face side of the housing in a second embodiment of the disclosure.

FIG. 8 is an enlarged schematic front view illustrating a portion of the rear face side of the housing in the second embodiment of the disclosure.

The second embodiment differs from the first embodiment in the structure of the catcher bottom face 160*a*. FIG. 8 schematically illustrates a relationship between a lowermost portion (third lowermost portion 153*a*) of a third ventilation group 153 (example of the ventilation portion 150) and a third catcher 163 (example of the leaked water catcher 160) corresponding to the third ventilation group 153. The catcher bottom face 160*a* of the third catcher 163 is inclined with respect to the width direction X. Specifically, the catcher bottom face 160*a* is lowest near the center in the width direction X, and is high at both ends in the width direction X. With this configuration, due to the inclination, it is possible to collect water accumulated at the catcher bottom face 160*a* in one location, and thus reduce the locations of the housing 140 that get wet to a narrow range.

As described above, the catcher side faces 160*c* are inclined, extending upwardly outward from the peripheral edges of the catcher bottom face 160*a*. A first catcher width W1 illustrated in FIG. 8 is a distance between lower ends of the catcher side faces 160*c* facing each other in the width direction X. Further, a second catcher width W2 is a distance between upper ends of the catcher side faces 160*c* facing each other in the width direction X, and is longer than the first catcher width W1.

The lateral widths (first catcher width W1 and second catcher width W2) of the leaked water catcher 160 in the width direction X are set larger than a width of the ventilation portion 150 in the width direction X. That is, preferably, the ventilation portion 150 (lowermost portion, in particular) is within a range in which the corresponding leaked water catcher 160 is provided. In this way, by making the lateral widths of the leaked water catcher 160 larger than the width of the ventilation portion 150, water entering through the ventilation portion 150 can be reliably received by the leaked water catcher 160.

Note that the embodiments disclosed herein are illustrative in all respects and are not the basis for a limited interpretation. Thus, the technical scope of the disclosure is not to be construed by the foregoing embodiments only, and is defined on the basis of the description of the claims. In addition, the meanings equivalent to the range of the claims and all changes made within the range are included.

REFERENCE SIGNS LIST

100 Image forming device
140 Housing
150 Ventilation portion
160 Leaked water catcher
160*a* Catcher bottom face
160*b* Catcher counter face (example of catcher erected face)
160*c* Catcher side face (example of catcher erected face)
X Width direction
Y Thickness direction
Z Height direction

The invention claimed is:

1. An image forming device comprising:
a housing covering a device main body;
ventilation portions provided on a side face of the housing, the ventilation portions including holes that extend through the side face such that air is supplied and discharged through the holes; and
a leaked water catcher provided below the ventilation portions and protruding toward an interior of the device main body, wherein
the ventilation portions are arranged in a height direction,
the leaked water catcher includes a catcher bottom face extending toward the interior of the device main body, and faces and communicates with a lowermost portion of the ventilation portions, and
the catcher bottom face makes contact with the side face of the housing below the lowermost portion of the ventilation portions, and is inclined, increasing in height as a distance from the side face of the housing increases.

2. The image forming device according to claim 1,
wherein the leaked water catcher further includes
a catcher erected face erected on a peripheral edge of the catcher bottom face.

3. The image forming device according to claim 2,
wherein the catcher erected face is inclined, extending upwardly outward from the peripheral edge of the catcher bottom face.

4. The image forming device according to claim 1,
wherein the catcher bottom face is further inclined with respect to a width direction along the side face of the housing.

5. The image forming device according to claim 1,
wherein the leaked water catcher has a lateral width in a width direction along the side face of the housing being greater than a width of the ventilation portions in the width direction.

6. The image forming device according to claim 1,
wherein a plurality of leaked water catchers, including the leaked water catcher, is disposed in the housing, and
leaked water catchers in the plurality of leaked water catchers are connected to each other.

* * * * *